United States Patent Office 3,398,039
Patented Aug. 20, 1968

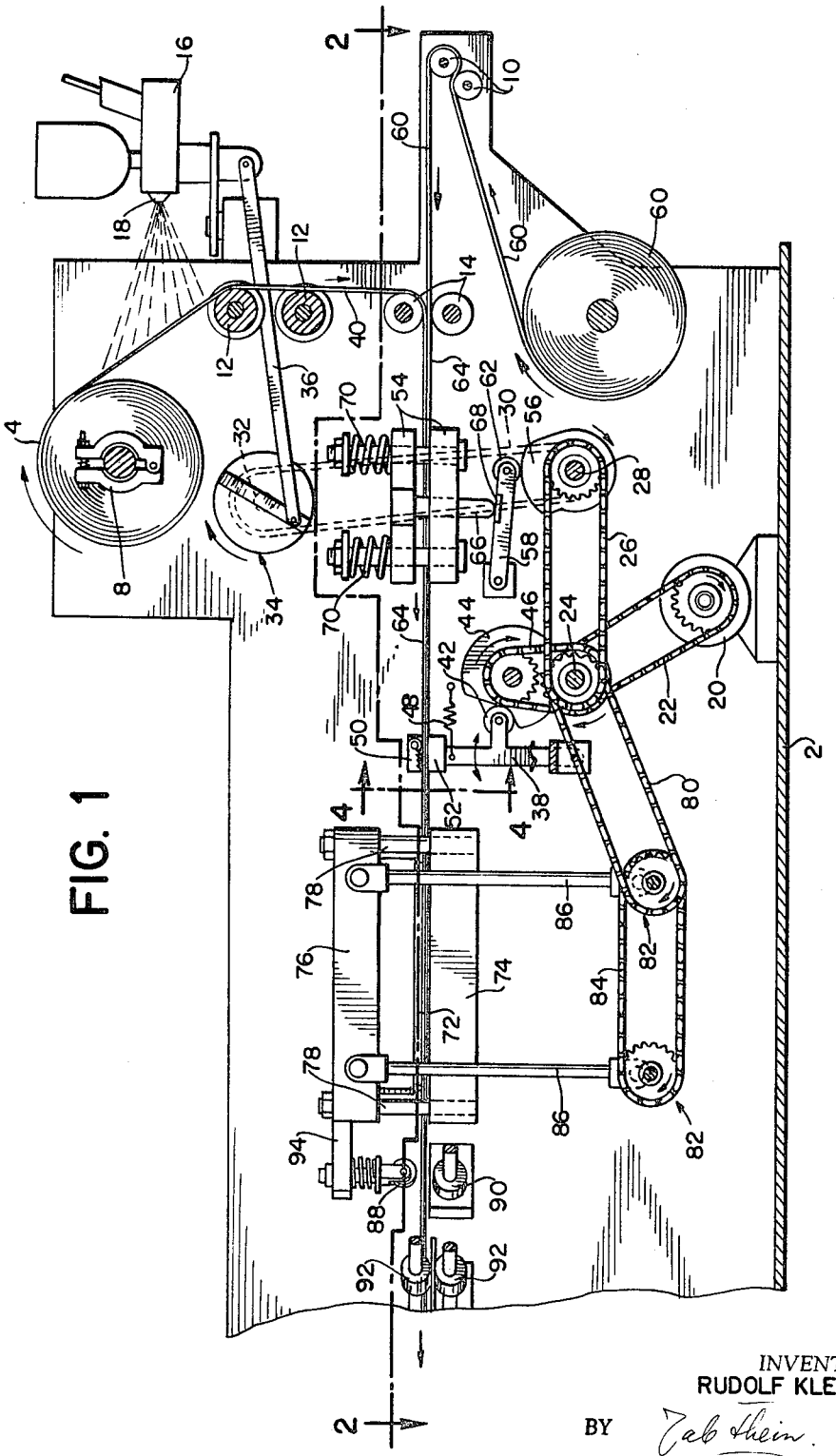

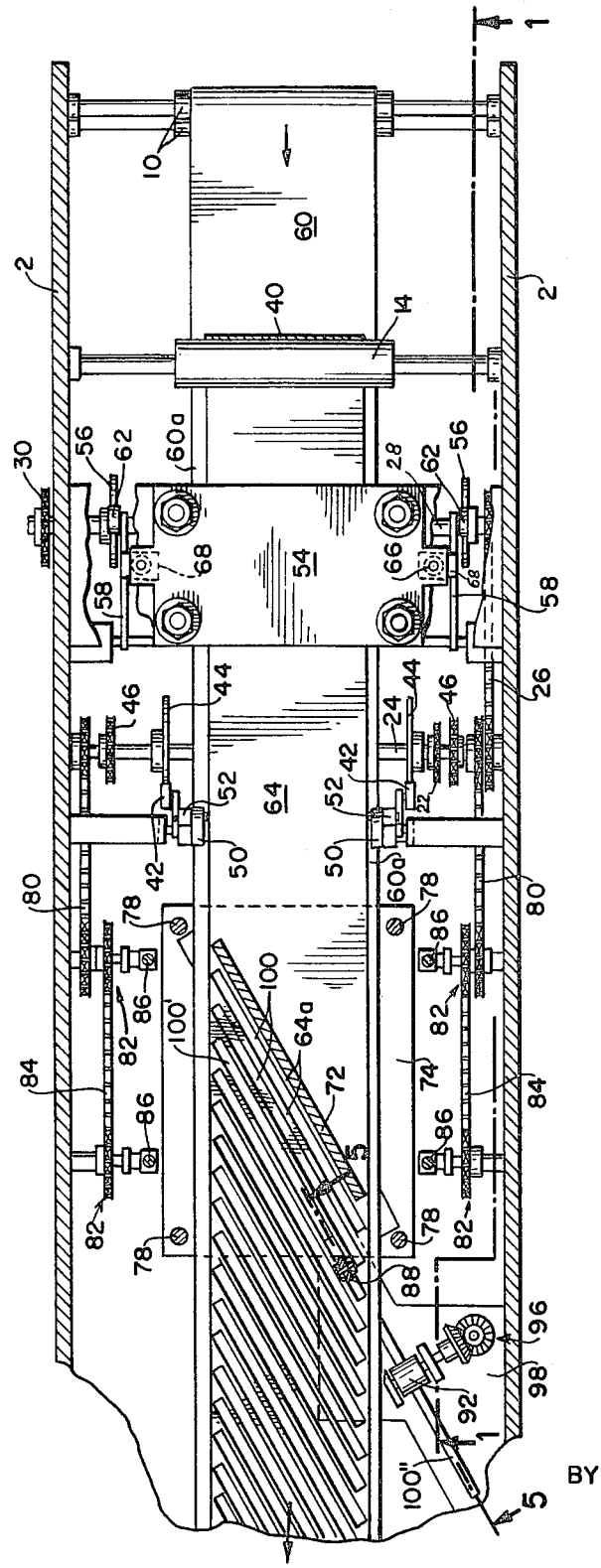

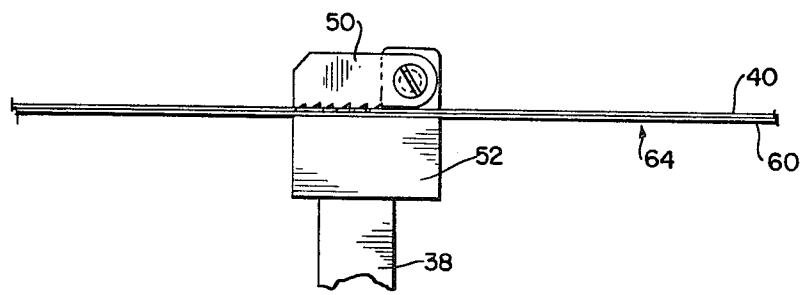
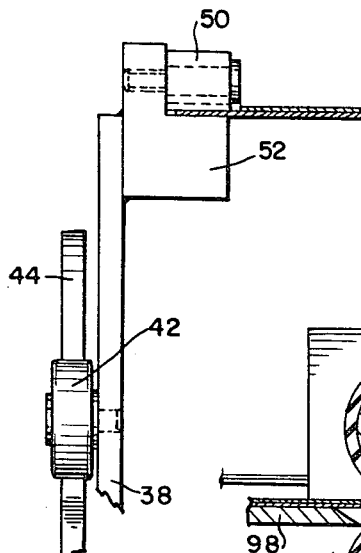
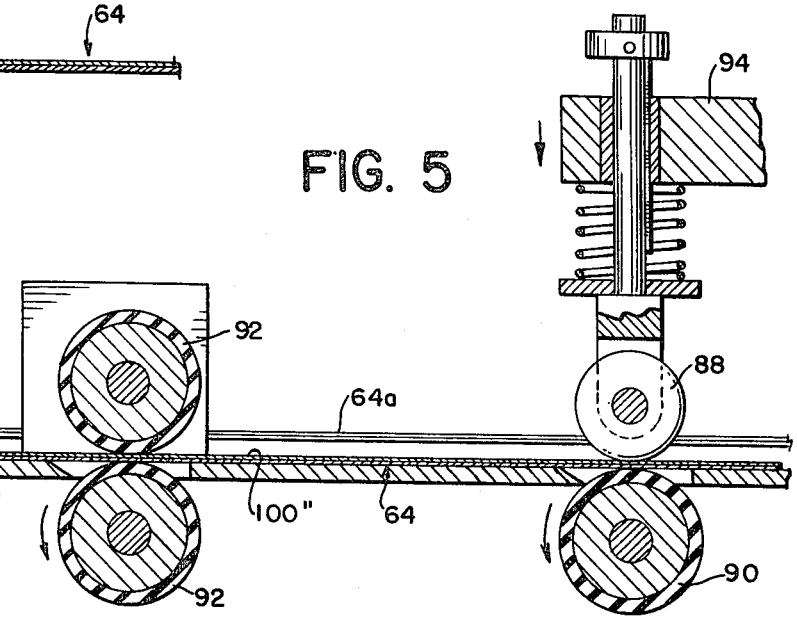
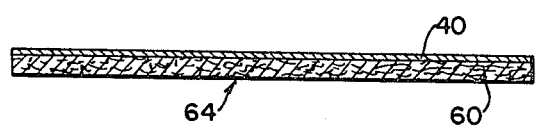

3,398,039
EQUIPMENT FOR MAKING LAMINATIONS FOR X-RAY ANTIDIFFUSING SCREENS
Rudolf Klemm, Fritz Wagner, Heinz Ehrentraut, and Werner Hempel, Dresden, and Kurt Schumann, Radebeul, Germany, assignors to VEB Transformatoren- und Rontgenwerk Dresden, Dresden, Germany
Filed Aug. 19, 1965, Ser. No. 481,049
14 Claims. (Cl. 156—510)

The present invention relates to an equipment for making laminations for X-ray antidiffusing screens, which laminations consist of a strip of material with a low and another strip with a high X-ray absorption. In particular, the novel equipment comprises suitable transport means, a calender-type and a pressing device, working step by step, in combination with an adhesive applying or gluing device and a cutting device.

Laminations for X-ray antidiffusing screens consist, as a rule, of a strip of material with a low X-ray absorption, for example, pressboard (called "Presspahn"), which is lined or laminated with a tin foil of a material having a high X-ray absorption, in most cases with a lead foil.

In the manufacture of these screen laminations, the procedure up to now consisted in applying a thin coat of a suitable adhesive by hand or by suitable means onto a thin lead foil, cut according to a certain length and number of laminations. On this prepared lead foil is then applied a correspondingly cut pressboard strip, and both are compressed and smoothed by hand or by a suitable machine, for example, a calender.

After a certain drying time, which varies according to the type of adhesive, the individual laminations are cut out from the laminated lead-pressboard strip in a suitable cutting tool and processed further, after a quality control, for example, in a stratigraphic or layer photography device.

The known procedure in the manufacture of laminations for X-ray and antidiffusing screens, however, is completely unsuitable for a continuous and rational production of these laminations, and has in addition various technical shortcomings, so that the quality of the screen laminations produced is considerably impaired. Thus, for example, it is not always possible to apply the adhesive on the lead foil as a uniform thin film, which in turn has the result that the adhesive oozes out during the subsequent pressing between the lead foil and the pressboard strip, and spills over the pressing tool, for example, the rolls of a calender, or the surplus is absorbed by the relatively hygroscopic pressboard strip. In the latter case, the pressboard would work or warp during the drying process, that is, the entire lead-pressboard strip may become uneven and undulated.

Besides, the thin lead foil is not very resistant to mechanical stresses. Due to the application of the adhesive and the subsequent combination and joining with the pressboard strip, the compressing and the feeding to the cutting tool, which are effected by hand in many cases, such stresses on the lead foil cannot always be avoided.

A decisive disadvantage, however, is the fact that a continuous and economic production is not possible with the present procedure in the manufacture of screen laminations. This disadvantage is the more significant as screen laminations are required in great numbers.

One of the main objects of the invention is therefore, to eliminate the technical and economical shortcomings in the known and widely used methods for the manufacture of X-ray screen laminations.

It is also the object of the invention to provide an equipment which permits a continuous and rational as well as economic production of screen laminations, making sure that the adhesive is applied to the lead foil in the desired thickness and uniformly, and that the sensitive lead foil is not unduly stressed mechanically during the entire manufacturing process.

This process is to take place, according to the invention, without interruption from the feeding or introduction of the two materials, namely the lead foil and the pressboard strip, until the finished lamination is removed or discharged from the cutting tool, completely automatically and without manual intervention.

It should be noted that a copending patent application of the inventors Kurt Schumann and Heinz Ehrentraut, entitled "Equipment for Waxing Laminations for X-Ray Antidiffusing Screens," Ser. No. 481,048, and filed concurrently herewith, fully describes the waxing of the laminations after they have been produced with the inventive equipment according to the present application.

The inventive object is solved, according to one of the major features of the invention, by providing at the inlet of the equipment two constantly braked rolls or drums to receive two band-shaped materials, as well as additional deflecting rollers and an adhesive-applying or gluing device, and by the means effecting the conveyance or transportation of the band-shaped materials, which pull these materials through a calender-type device and a pressing device, working step by step and conducting the laminated band-shaped materials to a cutting tool. The cutting tool cuts the laminations out of the band-shaped or web material in such a way that the longitudinal lamination axis forms an acute angle with the direction of motion or advance of the band-shaped material.

According to another feature of the invention, a spray gun is used as a gluing device, which is arranged ahead of the calender-type device so that its nozzle axis intersects the web material to be glued at an acute angle, and that it can be moved in addition over the width of the material web by means of suitable driving elements.

The pressing device comprises, according to a preferred feature of the invention, two plane plates guided in parallel relationship, of which the lower plate is rigid while the upper plate is driven directly or indirectly by the conveyor means for the band-shaped materials in such a way that the pressing of the materials is effected between two working steps of the conveyor means, that is, when the band or web stops.

The conveyer means for the band-shaped or web materials consist of two one-armed levers which are swivably mounted at one end at both sides of the material web, namely behind the pressing device, while claw-shaped elements are provided at their other ends. The two levers are swiveled stepwise by an eccentric in such a manner that the claw-shaped elements engage at the start of each transporting step the edges of the pressboard strip, which protrude slightly over the width of the lead-foil band, pull the composite, laminated material band by one step ahead, and release it again.

The tool for cutting out the laminations from the laminated material web consists of a stationary lower part and of a movable upper part. On this upper part is arranged, behind the cutting tool in the direction of motion, an ejector in the form of a spring-biased roller which presses at each stroke of the cutting tool a lamination that has already been cut out from the lattice of the material web, against an underlying constantly revolving transport roller.

The various objects, features and attendant advantages of the present invention will become more apparent from the following description of a preferred embodiment of the equipment for making X-ray laminations according to this invention, when considered in conjunction with the accompanying drawings, wherein:

FIG. 1 is a somewhat simplified side elevational view of the inventive equipment, with the side wall removed to show the inner mechanism, taken along line 1—1 of FIG. 2;

FIG. 2 is a similar sectional view in a horizontal plane, of the same equipment, taken along line 2—2 of FIG. 1;

FIG. 3 is an enlarged detail view of a claw-type advancing mechanism for the material band;

FIG. 4 is also an enlarged detail illustration, taken along line 4—4 of FIG. 1;

FIG. 5 is an oblique detail view, taken along line 5—5 of FIG. 2; and

FIG. 6 is a considerably enlarged sectional view of a finished lamination made with the equipment according to the present invention.

The equipment according to the invention, essentially shown in FIGS. 1 and 2, comprises a base or frame 2 having appropriate portions for supporting the operating and structural elements. At the inlet of the equipment, on the right-hand side of the FIGS. 1 and 2, is arranged a supply roll 4 for a band-shaped lead foil 40, and another supply roll 6 for a similarly band-shaped pressboard strip 60. The strip 60 is slightly wider than foil 40 and has somewhat protruding edge portions 60a. The roll 4 is constantly braked on its shaft by a shoe brake 8, while the pressboard strip 60 unwinding from the roll 6 is conducted between two stationary deflecting and braking rollers 10 which apply a constant pressure to the strip. The lead foil 40 is fed over two deflecting and flanged guide rollers 12 to a calender-type device comprising two cylinders 14. From the rollers 10, the pressboard strip 60 is fed to the calender device 14 in a straight line.

Somewhat below the supply roll 4, is arranged a spray gun 16 operating with compressed air, and supported from the frame 2 for a pivoting movement transverse to the direction of motion of the lead foil 40. The storage tank of the gun 16 is filled with a suitable adhesive. The axis of nozzle 18 of the gun 16 and the central adhesive jet dispensed thereby respectively form an acute angle with the lead foil 40 as it unwinds from the roll 4.

On the base 10 is provided a centralized drive 20, for example, an electric motor; a chain (or belt) drive 22 rotates a shaft 24 from which are derived other rotational movements, as will be explained later. Another chain drive 26 actuates another shaft 28 which, in turn, transmits its rotation by way of a drive 30 to a shaft 32 in the top region of the frame. A conventional eccentric disc and lever arrangement 34 operates a crank lever 36 which pivots the spray gun 16 during the operation of the equipment.

Following the pivotal movement of the gun 16, which is in complete synchronism with the conveyer means for the lead and pressboard strips 40, 60, and the spraying of the adhesive under an acute angle, and an appropriately provided suction device (not illustrated), which results in proper bundling of the jet of adhesive emanating from the nozzle 18, a completely uniform adhesive layer is obtained on the lead foil 40. The thickness can be accurately regulated.

The lead foil 40, now provided with an adhesive coat or layer, is conducted through the rolls 14 together with the pressboard strip 60, whereafter this can be termed a composite material band 64. The compression of the two materials is not effected here because it has been found that the pressing by way of rolls (e.g., those shown at 14) is unfavorable insofar as the adhesive, which is still liquid or semiliquid, is squeezed out between the foil and the pressboard strip, and forms an adhesive accumulation or hump. This would allow the adhesive to reach the rolls 14, as well as the edges of the material band 64, and also the lattice remaining after the band has been cut out for forming the laminations. A satisfactory transportation of the material band and a proper cut-out of the laminations would, therefore, not be assured; also, the material band would stick to both the conveyer means and to the cutting tool.

Besides, a uniform application of the adhesive would not be possible with the roll-type of pressing; also, if the coat or layer had first been applied uniformly, it would be destroyed again by the adhesive hump forming ahead of the rolls 14.

The transportation of the material band 64 is effected in a stepwise manner by means of two swivel levers 38, one on each side of the equipment. Each lever 38 is pivotally mounted at the lower end, and has a lateral extension carrying a cam follower 42 in contact with a cam disk 44. The latter is driven over another chain drive 46 from shaft 24. A traction spring 48 (omitted from FIG. 2 for the sake of clarity) urges follower 42 in continuous contact with disk 44. At their top ends, the levers 38 carry claw-shaped elements 50 (best seen in FIG. 3), pivotable with respect to a lower portion 52. The band 64 is guided between the portions 50, 52. Whenever follower 42 and the lever 38 move toward the disk 44, during each of its revolutions, the claw structure with portions 50, 52 will move backwards, that is toward the inlet of the equipment, only to be forced back again by the rotation of the disk 44, against the action of spring 48. This will entrain a predetermined length of the material band 64, substantially corresponding to the width of one lamination, as will be explained somewhat later.

At the start of each pivotal and linear movement of the system, the jaws or claws 50 are acted upon simultaneously in a manner not represented here so that they positively engage the material band 64, that is, the edges 60a of the pressboard strip 60 slightly protruding at both sides over the width of the lead foil 40, and carry along the band 64 a certain amount, depending upon the movement of lever 13.

Since both the band-shaped lead foil 40, due to the effect of the shoe brake 8, and the pressboard strip 60, owing to the effect of the brake rollers 10, are braked, both constituents, as well as the material band 64 proper, are held tight during the advancing step, without undue mechanical stresses applied thereto. Besides, this braking effect prevents effectively the trailing of the two materials at the end of each moving step, due to the inertia of the supply rolls 4 and 6.

At the end of the pivotal movement of lever 38, the claw-shaped elements 50 release the material band 64 again, so that it comes to a stop between two successive advancing steps. During the standstill period, while the disk 44 makes another revolution between its re-entrant profile portions, the superposed and glued materials of the band 64 are compressed.

A pressing device 54 also works in synchronism with the conveying means constituted by elements 44, 38, 50. The moving upper part of the device 54 is controlled by another cam disk 56 secured to the shaft 28, by the intermediary of a swivel lever 58 which carries a cam follower 62. It will be seen from FIG. 1 that a depending portion 66 of the upper pressing part 54 rests upon a limb or bent-out portion 68 of lever 58. If necessary, the lever 58 may be biased toward the cam disk 56 by conventional, not illustrated means. The upper part 54 is always pressed against the rigid and stationary lower part, during the standstill of the material band 64, on effect of appropriate compression springs 70 bearing down on the upper pressing part 54.

It will be understood that the cam disks 44, 56 are so correlated, set up and driven by the interconnecting chain drives 26, 46 that the advancing action and the pressing alternate; in other words, there is no advancing while the pressing is carried out, and vice versa.

Since the path covered by the material band 64 is relatively small during the advancing step, as compared to the length of the pressing device 54, each point or section of the band is compressed several times during the passage of the band through the pressing device 54. It may be added at this point that, according to FIG. 2, the above-described elements of the mechanism are provided on both sides of the equipment, although reference is being had in the specification to one of the duplicated elements alone.

As mentioned before, the band 64 is advanced by the claws 50 step-by-step toward a cutting tool having a die 72 is so designed and arranged that it cuts out one lamination at a time. FIG. 2 shows that the longitudinal axis of the die 72, and thus of the completed lamination, form an acute angle with the direction of advancement of the material band 64. A die bed 74 is mounted in a stationary manner underneath the band path, while an upper press portion 76 is slidable on posts 78.

The press platen portion 76, actuating the cutting die 72, is likewise driven by the centralized drive 20 in synchronism with the conveyor means and the pressing means described before, so that a lamination is cut out between two moving steps, just when the material band 64 stops. The path covered by the band during the advancing movement is set so that a relatively narrow strap or ridge 64a remains between adjoining cut-out laminations 100 in the material band 64. Shaft 24 is also connected with a chain drive 80 to a pair of eccentric members 82, interconnected by another chain 84. The stub shafts for the members 82 are journaled in the frame 10 (see FIG. 2). Linkages 86 are provided for transmitting the vertical reciprocation caused by the eccentrics 82 to the platen portion 76 where these linkages are pivotally attached, as shown.

On the moving upper press portion 76 and on the cutting tool 72, respectively, is arranged an ejector in the form of a spring-biased roller 88 which presses at each stroke of the press and of the tool down on an already cut lamination 100, made during the preceding stroke, from the lattice of the band 64, against an underlying, constantly revolving transport roller 90. This roller conveys the lamination during the relatively short cutting time so far that it is already engaged and moved further by two additional transport rollers 92 by the time the die 72 and the ejector roller 88 rise.

The ejector roller 88 is narrower than the smallest lamination 100 and is capable of readily rotating since it is rotated at each ejection by the transport roller 90. However, the supporting bolt of roller 88 has to be prevented from turning sideways, so as to keep the acute angle mentioned before with respect to the path of the band 64. To this end, a key-and-groove structure is provided in a support element 94 connecting the ejector structure with the press platen 76 (see FIG. 5).

Transport rollers 92 are preferably rubber-covered and so is roller 90, as shown in FIG. 5. Rollers 92 are driven by conventional means, e.g., by gears 96. Underneath the upper roller 92 and the ejector roller 88, a transfer bed or plate 98 is arranged so as to provide a base for the operation of said rollers. As shown in FIG. 5, appropriate slots are provided in this plate, for the lower roller 92 and the transport roller 90.

The arrangement of the cutting tool 72 in a transverse direction, forming an acute angle with the direction of motion of the material band 64, has the advantage that the lead foil 40 can be substantially narrower than the finished laminations 100 are long and that, on the other hand, the ejected laminations 100 can be removed from the equipment in a direction which deviates only slightly from the longitudinal direction of motion of the band 64.

The latter advantage is of particular importance in view of the installation of an assemby line, namely when additional processing apparatus are arranged in the line behind the equipment according to the present invention.

It should be noted that the bolt of roller 88 is preferably spring-biased, as shown in FIGS. 1 and 5, so as to provide the necessary resiliency for the pressing down of the laminations. In FIG. 2, the last cut-out lamination is designated with 100′, and the lamination just ejected with 100″ (see also FIG. 5). The remainder of the material band 64, containing nothing but the ridges or straps 64a, is removed at the discharge or left-hand end of the equipment.

The foregoing disclosure relates only to a preferred, exemplary embodiment of the invention, which is intended to include all changes and modifications of the equipment described within the scope of the invention as set forth in the appended claims.

What we claim is:

1. An equipment for making laminations for X-ray antidiffusing screens, comprising, in combination, a frame, two supply rolls journaled in said frame, one for a band-shaped lead-foil material and the other for a band-shaped pressboard-strip material, a pair of deflecting rollers for guiding at least one of said materials, gluing means for applying an adhesive to one of said materials, calender means for guiding said materials into a substantially parallel, superimposed path, planar pressing means for uniting said materials into a composite, united material band, reciprocating transport means for advancing said material band, and cutting means for forming individual laminations from said material band.

2. An equipment as defined in claim 1, wherein said cutting means includes a die forming an acute angle with the advancing path of said composite band and being longer than the width of said band, and wherein said transport means advances said composite band by the distance between successive cut-outs performed by said cutting means.

3. An equipment as defined in claim 2, wherein said cutting means includes a stationary lower portion and a movable upper portion, said die being attached to said upper portion, and further includes an ejector behind said die and also attached to said upper portion, for applying pressure to previously cut-out laminations and removing them from said composite band.

4. An equipment as defined in claim 1, wherein said gluing means is arranged a certain distance away from said calender means along the path of said lead-foil material fed by one of said supply rolls, said gluing means including a spray gun having a major nozzle discharge direction defining an angle other than perpedicular with respect to said path of the lead-foil material, and wherein said gluing means further includes means for moving said spray gun across said path of the lead-foil material for uniform distribution of said adhesive.

5. An equipment as defined in claim 1, wherein said pressing means includes a stationary lower plate and a movable upper plate for compressing said material band therebetween, the equipment further comprising drive means including means for operating said pressing means between successive operational phases of said transport means.

6. An equipment as defined in claim 1, wherein said transport means includes at least one swivable lever mounted to said frame between said pressing means and said cutting means, a pivotable claw-shaped element attached to the free end of said lever for engaging a peripheral portion of said material band, and means for swiveling said lever whereby to advance said material band by the distance between successive cut-outs performed by said cutting means.

7. An equipment as defined in claim 6, wherein said swiveling means includes an eccentric drive correlated with said pressing means so as to advance said material band between successive operational phases of said pressing means.

8. An equipment as defined in claim 7, wherein said eccentric drive includes a cam disc acting upon an intermediate portion of said lever so as to move it in the direction of travel of said material band, against the action of a restoring spring.

9. An equipment as defined in claim 1, further comprising ejector means behind said cutting means in the direction of travel of said material band and movable substantially in unison with said cutting means toward and away from the top surface of said material band, and transport roller means adjacent the bottom surface of said material band, in substantially aligned relationship with said ejector means, for laterally removing previously cut-out laminations from said direction of travel.

10. An equipment as defined in claim 9, wherein said cutting means defines an acute angle with respect to said direction of travel, said ejector means and said transport roller means being aligned with said cutting means, and further comprising a pair of transport rollers sideways of said transport roller means and rectilinearly aligned with the same and with said cutting means, for successively and individually conveying said laminations away from the equipment.

11. An equipment as defined in claim 10, wherein said cutting means includes a die secured to and reciprocable together with a movable upper portion of said cutting means, and further comprising resilient means between said ejector means and said upper portion to which it is secured.

12. An equipment as defined in claim 11, further comprising drive means for said pressing means, said transport means and said cutting means, and means for correlating the operational phases of the aforementioned four means so that the phases of said pressing means and said cutting means substantially coincide while they alternate with the operational phase of said transport means.

13. An equipment as defined in claim 12, further comprising means for swiveling said gluing means transversally to the path of said lead-foil material from its supply roll to said calender means, said swiveling means being operatively connected with said drive means.

14. An equipment as defined in claim 12, wherein the active length of said pressing means is several times the distance by which said material band is advanced by said transport means, so that subsequent areas of said material band are repeatedly acted upon by said pressing means before one of said laminations is stamped out by said cutting means.

References Cited

UNITED STATES PATENTS

| | | | |
|---|---|---|---|
| 2,566,249 | 8/1951 | Rainey et al. | 156—324 |
| 2,980,159 | 4/1961 | Greene | 156—549 |
| 3,037,900 | 6/1962 | Hings et al. | 156—549 |
| 3,303,082 | 2/1967 | Wilson | 156—324 |
| 3,318,749 | 5/1967 | Califano et al. | 156—549 |
| 3,340,678 | 9/1967 | Rhodes | 156—510 |

DOUGLAS J. DRUMMOND, *Primary Examiner.*